April 7, 1970 R. N. HEINO 3,504,477
ARTICLE COUNTING AND FILLING MACHINE
Filed Feb. 19, 1968 3 Sheets-Sheet 1

INVENTOR
Richard N. Heino
BY Chas. R. Day
ATTORNEY

INVENTOR
Richard N. Heino
BY Chas. R. Fay.
ATTORNEY

United States Patent Office 3,504,477
Patented Apr. 7, 1970

3,504,477
ARTICLE COUNTING AND FILLING MACHINE
Richard N. Heino, Ashby, Mass.
(P.O. Box 442, Fitchburg, Mass. 01420)
Filed Feb. 19, 1968, Ser. No. 706,302
Int. Cl. B65b 57/20
U.S. Cl. 53—78
2 Claims

ABSTRACT OF THE DISCLOSURE

A high speed article counting and filling machine in which the containers to be filled move in a straight line and are precisely separated while being stopped under a line of chutes which in turn receive multiple articles in a timed relationship to the stopping of the containers from an inclined gravity fed line of grooves, said grooves appearing in a plurality of plates which are quickly and easily removed and replaced for counting and filling articles of different sizes, the precise spacing means for the containers comprising an elongated screw shaft, the containers being received in the troughs or roots of the threads therein.

BACKGROUND OF THE INVENTION

In the packaging arts there has been a problem of speeding the action of filling and counting discrete articles in containers, e.g. in the pharmaceutical industry. Where for instance bottles are filled with tablets or pills, they are thereafter cottoned, lids applied, labels applied, etc., and the slowest operation is that of filling the containers as this takes an interval of time much greater than is required merely to apply cotton, to label, to apply caps, etc.

One solution was thought to exist in providing a rotary machine in which the containers generally were moving continuously while being filled and an example is U.S. Patent 3,061,990. The present machine is an improvement on the type of in-line apparatus disclosed in U.S. Patent 2,701,671. While it is true that rotary machines are capable of high speed counting and filling of predetermined sizes of articles such as for instance tablets, nevertheless it has been found that a serious difficulty encountered in any rotary machine is that they are very difficult to adjust for different sizes of tablets, so that a high speed rotary machine of the type disclosed in the aforementioned patent is found to be essentially for filling one size of article; whereas the average pharmaceutical packager, as well as other industries, requires a high speed machine which is easily changed over to handle articles of different sizes.

SUMMARY OF THE INVENTION

Therefore, the present invention contemplates an elongated, straight-line filling apparatus in which the grooves receiving the articles in single line and discharging the same in counted form, are arranged in a plurality of easily removed and replaced plates. In this case such filling plates are aligned, servicing a single line of containers, and fill a great many more containers than would be possible without such an in-line combination of plural filling plates. The containers, which are usually bottles, are moved along by an endless conveyor to the entry side of the filling apparatus where they are one by one picked up by the threads of a screw, regardless of the speed of the underlying conveyor, and are thereby advanced in precisely spaced relationship, to be aligned in a long line, each container being precisely aligned with a separate chute, the chutes receiving articles from a plurality of grooves having single-line articles therein. In the manufacture of bottles, the variations are such that it is found to be necessary to space the bottles precisely, in non-contacting relation, so as to insure that each bottle will receive all of the articles descending through its respective chute.

In this machine the screw stops the containers during and only during the filling interlude, the filling being fast due to the simultaneous drop of a plurality of lines of articles into each container, and as soon as they are filled, the screw is reactivated to eject the long line of filled containers and at the same time cause the entrance, in the spaced relationship referred to above, of a new line of empty containers. It has been found that by operating a plurality of the tablet-conducting plates, the speed of the rotary machine can be approximated.

DESCRIPTION OF THE PREFERRED EMBODIMENT

A general framework of any kind which is generally indicated at 10 may be supported on the floor in permanently arranged position or by the wheels shown. A good deal of the motive power for various parts may be contained in the housing 10 and in general an upper part thereof at 12 may be elevated with relation to a relatively fixed part 14 of the framework by means of an elevating crank 16 or the like.

Figure 3:
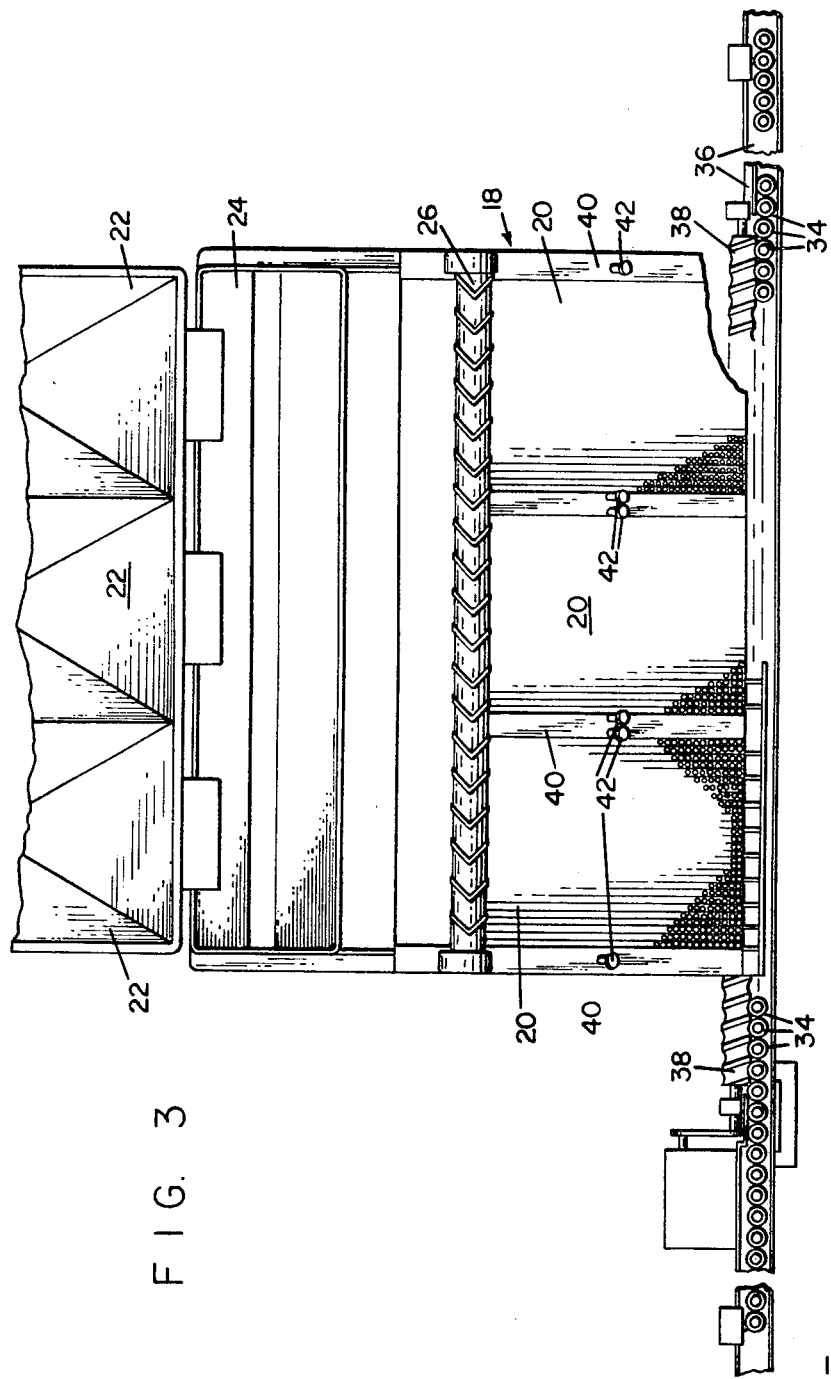
FIG. 3 is a partial plan view illustrating the action of the feed screw.

On the top of the frame 12 there is provided another supporting framework for a supporting unit generally indicated at 18. This supporting unit 18 provides a support for the three separate plates shown in FIG. 3 at 20, 20, all of these plates being substantially alike and all having a series of grooves down which the articles in single lines slide by gravity since they are arranged at an incline with respect to the horizontal. Articles may be provided in the hopper or the like 22 from whence they are transported by more or less conventional means to a receptacle at 24 provided with a spiral roll 26 to make the tablets form in a single plane arrangement for filling of the individual grooves in the plates 20, 20. The effect is that the grooves in the plates become generally filled, more or less according to U.S. Patent 2,701,671, although the actual construction is somewhat different. Each groove has an individual gate pin 28. These pins are mounted on a pin bar which is moved up and down by any means desired such as a cam, pneumatic means, etc. to stop the travel downwardly of the articles in the grooves.

Each groove is also provided with an individual counting pin 30 operable in the same manner or other way and in timed relation thereto, these pins stopping the articles in the grooves above the same while the pins 28 are retracted to allow all of the articles between pins to slide down into the chutes 32 for disposition in correspondingly positioned contaners 34 here shown as glass or similar bottles.

Figure 1:
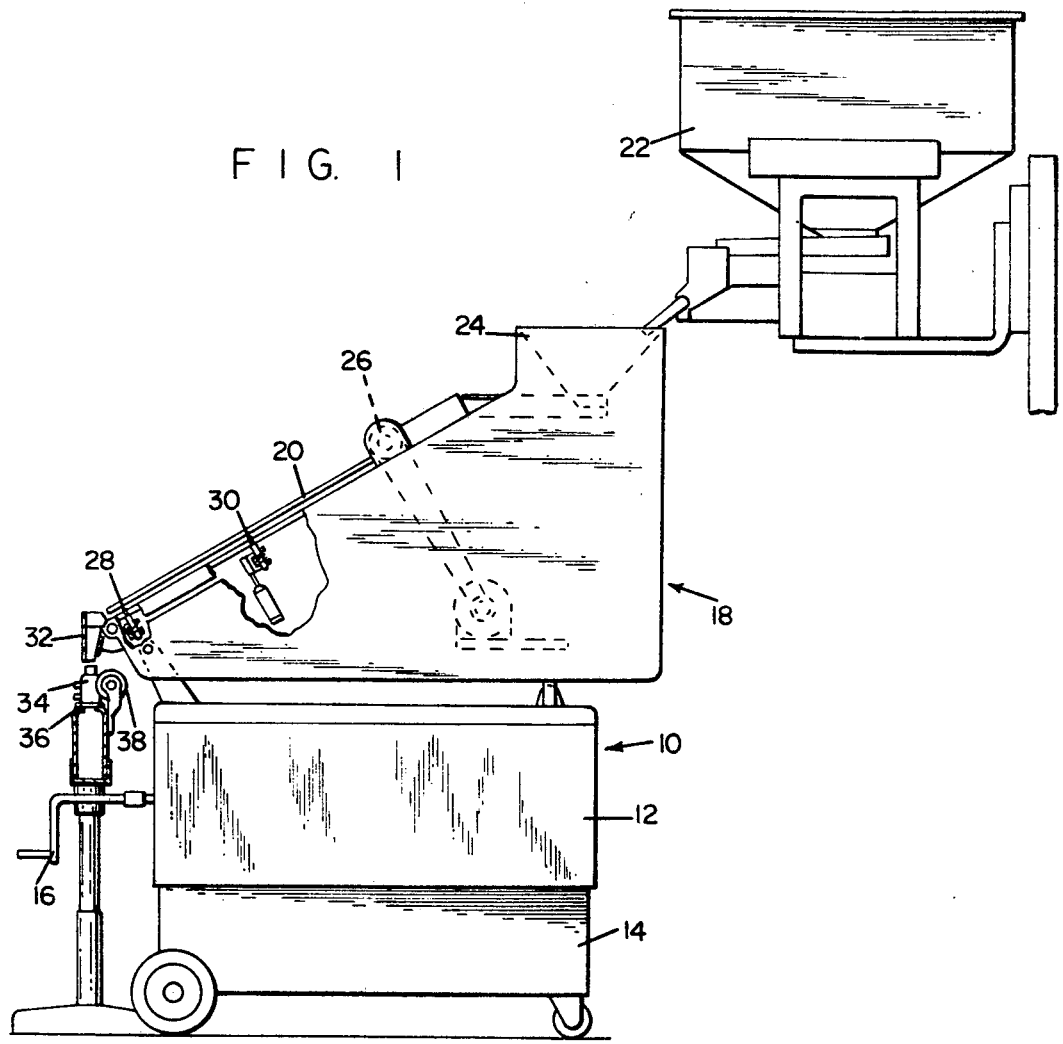
FIG. 1 is a view in side elevation, partly in section, illustrating the present invention.
Figure 2:
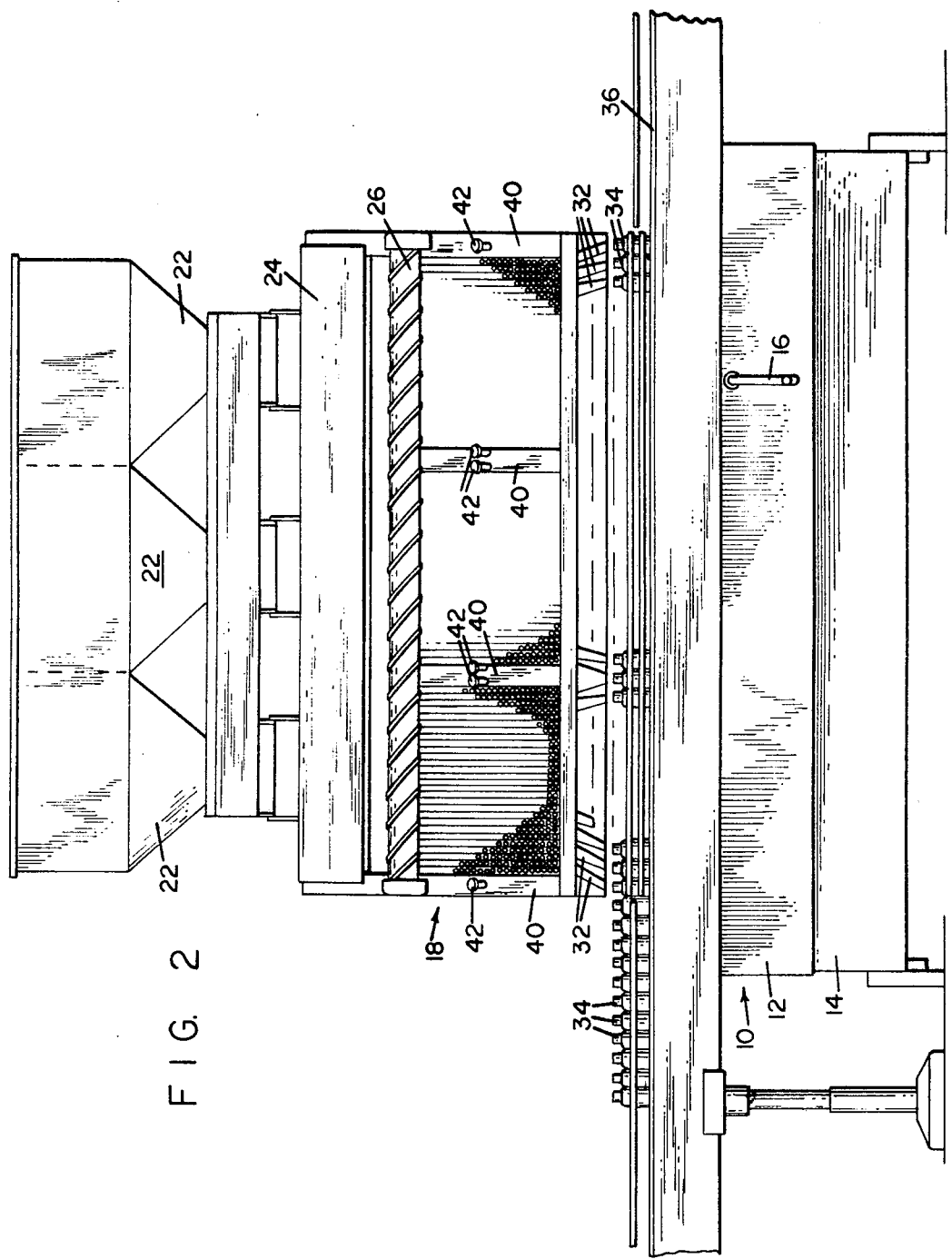
FIG. 2 is a view in front elevation.

As shown in FIG. 2 there are several grooves for each spout 32 so that for instance three lines of articles can be discharged at one time through a spout 32 into a single container filling the container at one drop.

The containers 34 are advanced to the unit from the left from a source of supply not shown, see particularly FIG. 2, on a conveyor chain 36 or a belt, and the same conveyor removes them after they are filled at the right hand side of the machine. As the containers are advancing to the filling station, they are in contact with each other, and it has been found that especially in the case of glass bottles, the tolerances are so great that the containers have to be more precisely positioned with respect to the individual spouts. This is done by means of a relatively large rotary screw 38 which is operated also in timed relation, accepting the containers from the line to the left, see FIG. 2. and as soon as the containers enter between the threads of the screw 38 they are spaced apart a precise amount which corresponds to the spacing of the chutes. The parts are arranged so that there is one container for each chute.

The plates 20, 20 are easily held in position in supports 40 by means of thumbscrews or the like at 42 but any desired means may be utilized for this purpose. It will be seen that it is only necessary to loosen the thumbscrews to remove the entire plates 20, 20 and they may then be replaced with different plates having wider or deeper grooves for the counting and filling of articles of a different nature. This is a very easy adjustment to make in contradistinction to the very laborious method of changing the plates with respect to the rotatry machine shown in U.S. Patent 3,061,990. In order to change over the rotary machine, the turrret has to be substantially completely disassembled and it is for this reason that the present invention is much more universal and flexible in use than the rotary machine, but at the same time it is found that it can be operated almost as fast.

In the operation, the screw 38 is always filled with containers. As soon as a complete complement of empty containers arrives at the filling position, FIG. 2, the screw is stopped and the filling and counting operation takes place. As soon as the containers are filled, the screw starts up again, taking the entire complement of filled containers off to the right in FIG. 2, while at the same time causing another complement of containers to be entered into the filling position. The conveyor 36 may be continuously operated as it merely slides under the containers held by the threads of the screw but of course this container may also be stopped in timed relation with respect to the screw should this be desired.

I claim:

1. A high speed straight-line article counting and filling machine comprising a conveyor, a filling and counting station, the conveyor being adapted to bring containers to the filling and counting station and to take them away after filling, the filling and counting station comprising a plurality of separately removable plates each having a plurality of grooves therein, and means mounting said plates, a source of supply of the articles, means leading the articles from the source of supply thereof to said plates and to said grooves, gate means in each groove for stopping the flow of articles, together with means for opening and closing the gate means, and other stop means in spaced relation with respect to the gate means in each groove for stopping the flow of articles into the area of the groove where the count takes place, a source of supply of containers in seriatim contacting relation, a rotating spiral container advancing device having a length approximately corresponding to the length of the combined plates, said spiral device receiving containers from said source one by one in the spaced troughs of the spiral and precisely separating said containers at the filling station according to the spacing of the troughs, in combination with a series of chutes each one leading from a plurality of article grooves to a single container so that a series of grooves supply a single container, means for intermittently rotating said spiral device for advancing a series of containers to the filling station and out of the filling station, and means for stopping the spiral device during the filling operation, with a container aligned with each chute, the troughs of the spiral device being constructed and arranged to align the spaced containers precisely with the respective chutes during the filling operation.

2. The article counting and filling machine of claim 1 wherein said spiral device advances the filled containers out of the filling station at the same time it engages, spaces and positions the next lot of containers.

References Cited

UNITED STATES PATENTS

| 2,532,098 | 9/1950 | Cremieux | 221—68 |
| 2,656,962 | 10/1953 | Daniels | 221—68 |
| 2,701,671 | 2/1955 | Lakso et al. | 221—68 |
| 2,845,759 | 8/1958 | Cote et al. | |
| 3,314,519 | 4/1967 | Kelly | 198—34 X |

TRAVIS S. McGEHEE, Primary Examiner